United States Patent
Paulus et al.

(10) Patent No.: US 7,960,854 B2
(45) Date of Patent: Jun. 14, 2011

(54) ELECTRICAL CONNECTOR CONFIGURED TO FORM COUPLING REGION IN AUTOMOTIVE GLAZING

(75) Inventors: Peter Paulus, Muenster (DE); Detlef Baranski, Recklinghausen (DE); Matthias Kriegel-Gemmecke, Wesel (DE); Ingo Eisenburg, Bochum (DE)

(73) Assignee: Pilkington Automotive Deutschland GmbH, Witten (DE)

( * ) Notice: Subject to any disclaimer, the term of this patent is extended or adjusted under 35 U.S.C. 154(b) by 188 days.

(21) Appl. No.: 12/514,733

(22) PCT Filed: Nov. 7, 2007

(86) PCT No.: PCT/EP2007/062019
§ 371 (c)(1),
(2), (4) Date: Jun. 3, 2009

(87) PCT Pub. No.: WO2008/058881
PCT Pub. Date: May 22, 2008

(65) Prior Publication Data
US 2010/0060077 A1      Mar. 11, 2010

(30) Foreign Application Priority Data

| Nov. 15, 2006 | (GB) | ................................. 0622785.4 |
| Nov. 15, 2006 | (GB) | ................................. 0622787.0 |
| Jan. 10, 2007 | (GB) | ................................. 0700433.6 |
| Jan. 10, 2007 | (GB) | ................................. 0700434.4 |

(51) Int. Cl.
*B60L 1/00* (2006.01)
(52) U.S. Cl. ........................................ 307/9.1
(58) Field of Classification Search .................. 307/9.1
See application file for complete search history.

(56) References Cited

U.S. PATENT DOCUMENTS 4,003,056 A    1/1977   Davis
(Continued)

FOREIGN PATENT DOCUMENTS

DE           44 24 833 A1        1/1996
(Continued)

OTHER PUBLICATIONS

Search Report issued in GB0622785.4, Apr. 12, 2007, UK Intellectual Property Office, United Kingdom.
(Continued)

*Primary Examiner* — Robert L. Deberadinis
(74) *Attorney, Agent, or Firm* — Buchanan, Ingersoll & Rooney PC

(57) ABSTRACT

An automotive glazing having a non-galvanic contact for an electrical device associated with the glazing is disclosed. The glazing comprises a first ply and a second ply of transparent glazing material having a ply of interlayer material extending between the plies of glazing material. The glazing also comprises an electric circuit, having a first connector portion, situated adjacent the ply of interlayer material, the first connector portion being configured to form a coupling region such that electrical signals in the circuit are can be coupled between the coupling region and an electrical device placed on the glazing. A second connector portion is included on the surface of the second ply of glazing material situated away from the interlayer material, and connectable to an electrical device. The second connector portion is adapted to receive a ferromagnetic core. This leads to an increased coupling factor (efficiency), making the connection suitable for powering a variety of electrical devices used within automotive vehicles and conventionally mounted on glazings.

36 Claims, 8 Drawing Sheets

U.S. PATENT DOCUMENTS

| | | | |
|---|---|---|---|
| 4,992,800 A | 2/1991 | Parfitt | |
| 5,105,201 A | 4/1992 | Nakase et al. | |
| 5,231,408 A | 7/1993 | Nakase | |
| 5,528,113 A | 6/1996 | Boys et al. | |
| 5,534,879 A | 7/1996 | Braun et al. | |
| 5,781,160 A | 7/1998 | Walton | |
| 6,177,790 B1 * | 1/2001 | Emberty et al. | 323/347 |
| 6,320,276 B1 | 11/2001 | Sauer | |
| 6,344,828 B1 | 2/2002 | Grantz et al. | |
| 2001/0013841 A1 | 8/2001 | Dishart et al. | |
| 2002/0189329 A1 | 12/2002 | Wimmer | |
| 2005/0146830 A1 | 7/2005 | Green et al. | |
| 2006/0273966 A1 | 12/2006 | Maeuser | |
| 2009/0102590 A1 * | 4/2009 | Rhodes et al. | 336/107 |

FOREIGN PATENT DOCUMENTS

| | | |
|---|---|---|
| DE | 203 17 060 U1 | 3/2004 |
| DE | 103 19 606 A1 | 11/2004 |
| DE | 10 2005 006 861 A1 | 8/2006 |
| DE | 10 2005 006 862 A1 | 8/2006 |
| DE | 10 2005 022 909 A1 | 11/2006 |
| DE | 10 2005 022 913 A1 | 11/2006 |
| DE | 10 2005 022 980 A1 | 11/2006 |
| EP | 0 608 554 A1 | 8/1994 |
| EP | 0 744 785 A1 | 11/1996 |
| EP | 0 849 823 A1 | 6/1998 |
| EP | 1 014 476 A1 | 6/2000 |
| EP | 1 256 261 A1 | 11/2002 |
| EP | 1 612 568 A1 | 1/2006 |
| GB | 2 172 148 A | 9/1986 |
| WO | WO 99/66588 A1 | 12/1999 |
| WO | WO 00/05824 A2 | 2/2000 |
| WO | WO 01/56334 A1 | 8/2001 |

OTHER PUBLICATIONS

*Form PCT/ISA/210 (International Search Report) dated Mar. 26, 2008.

U.S. Appl. No. 12/514,748, filed May 13, 2009, Baranski.

* cited by examiner

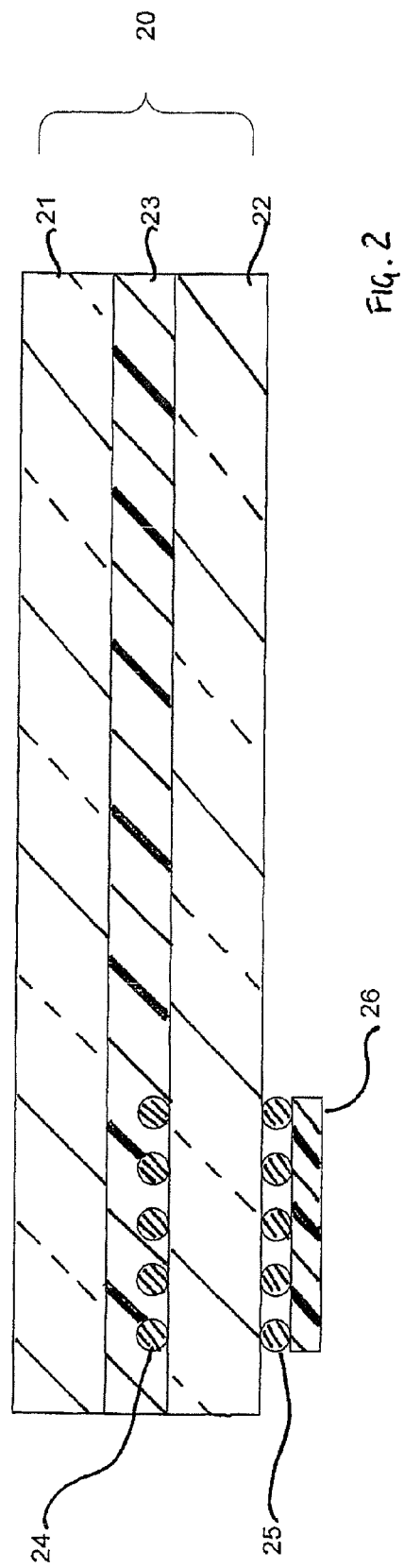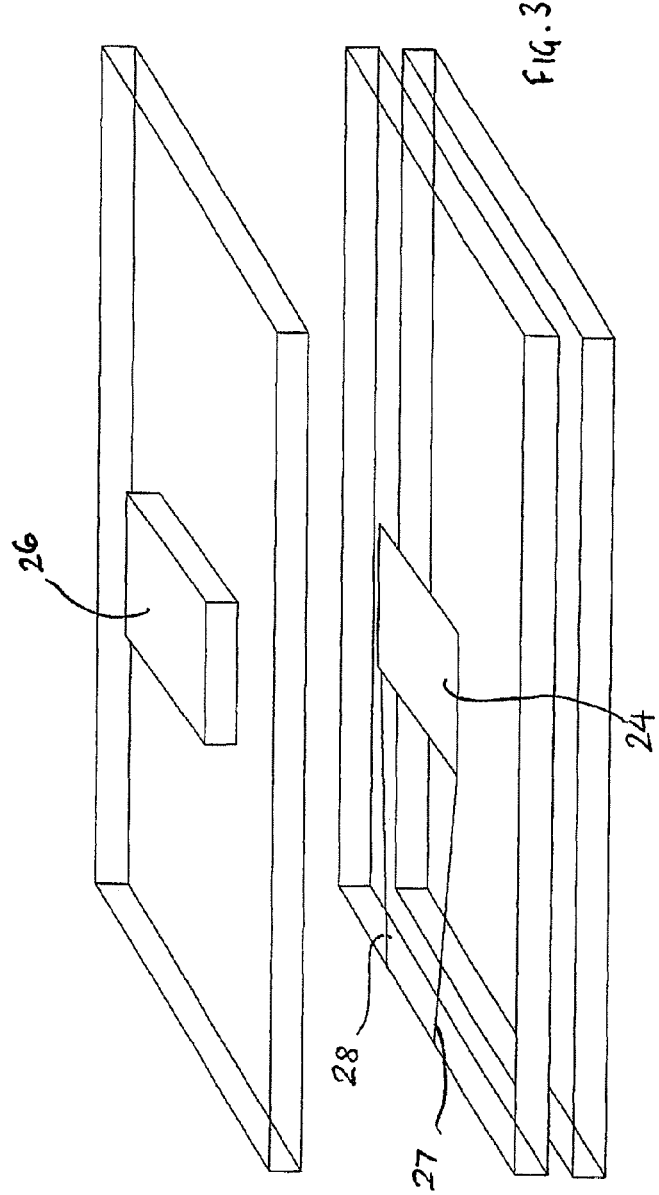

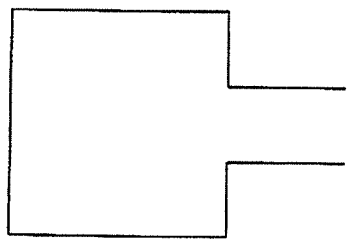
42
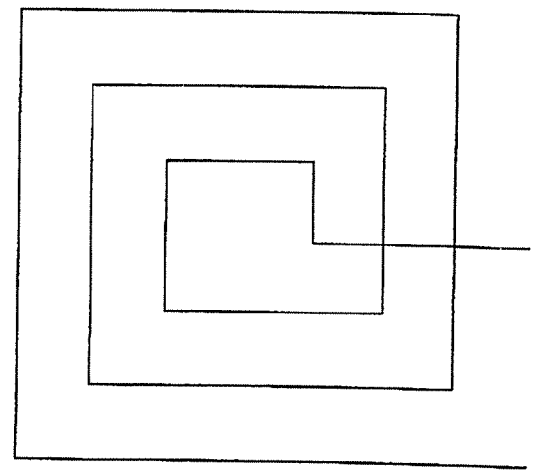
43
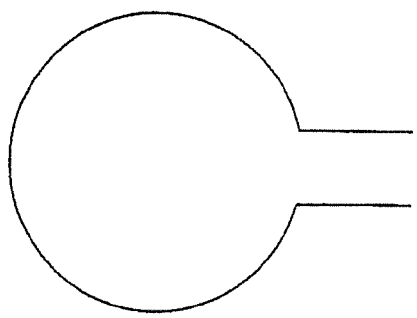
41
FIG. 4

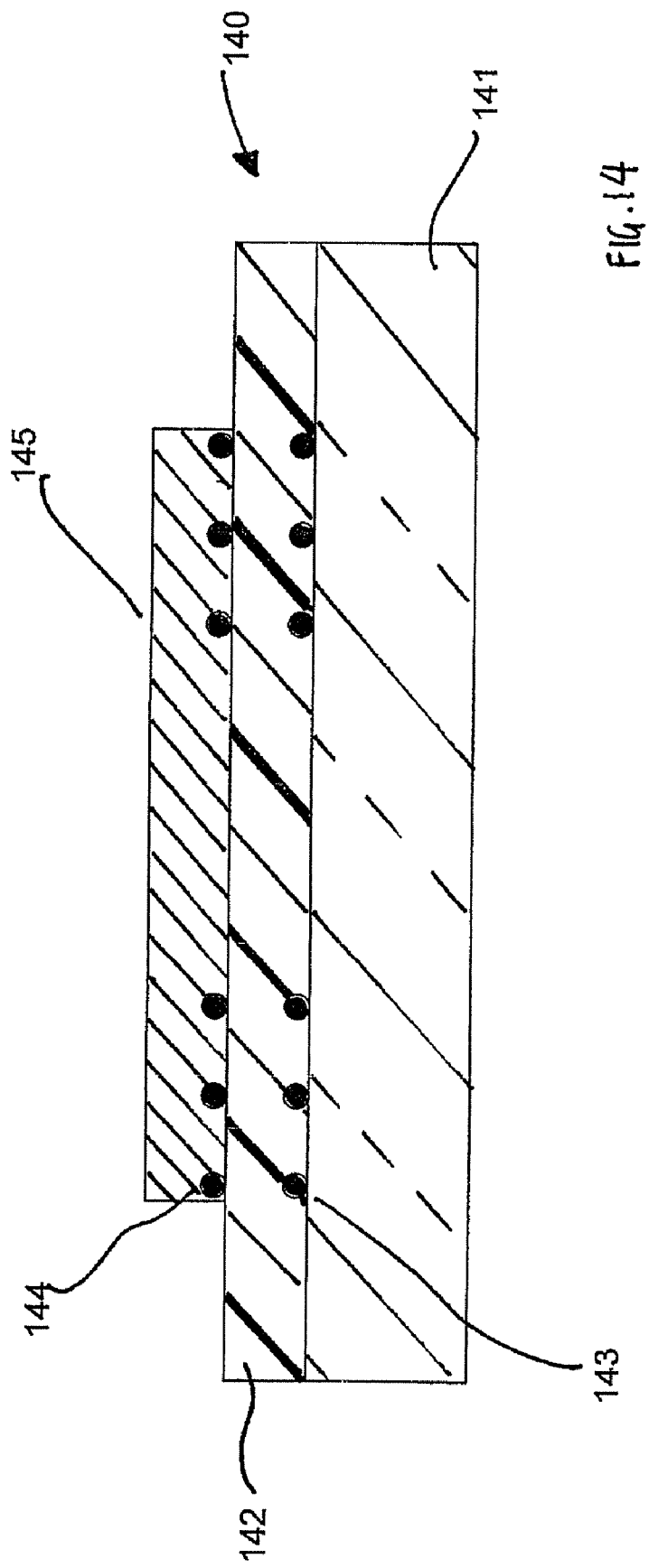

ELECTRICAL CONNECTOR CONFIGURED TO FORM COUPLING REGION IN AUTOMOTIVE GLAZING

The present invention relates to an automotive glazing having an electrical connector associated therewith, in particular, a connector that couples electrical power to a device positioned on the glazing.

In modern automotive vehicles sensors and other electrical devices such as electrochromic mirrors and cameras are often included on laminated glazings, rather than on the vehicle bodywork. Such electrical devices are generally adhered to the inside of a windscreen or backlight, near to the top or the bottom of the glazing. The glazing itself comprises two plies of glass laminated with an interlayer material, such as poly vinyl butyral, in between. The cabling to supply electrical power runs across part of the inner surface of the glazing to the site of the electrical device, and is typically covered with a cable channel. One disadvantage of this is that if the device is positioned a significant distance away from the top or the bottom of the glazing, the cabling is often visible, or cannot be hidden behind the obscuration band (a black band around the periphery of the glazing) or inside part of the internal trim of the vehicle. This restricts the available positions in which sensors and the like may be placed, as visible cabling cannot trail through the vision area of a windscreen or a backlight.

The positioning of sensors is a particular problem on large area glazings, such as so-called cielo windscreens, or windscreens which are used in conjunction with butterfly wipers (which wipe from the A posts towards the lower edge of the windscreen). Rain sensors and some other sensors need to be placed within the wiped area of the glazing. For example, in the case of a cielo windscreen, the uppermost region of the wiped area begins a distance of at least 0.5 m away from the upper edge of the glazing. In the case of a butterfly wiping system the wiped area has a large distance from the top edge of the glass at the centre line of the glass.

One solution to this problem is to print an electric circuit onto an outer surface of one of the plies of glass forming the laminated glazing, which faces to the passenger cabin. Whilst the printed lines are often less visible than ordinary or thinner, flexible connectors, in order to provide the power density necessary for the sensor to work, the lines in the power circuit would be wide enough to be easily visible. In addition these lines are not insulated electrically and therefore short circuits can occur or electro-corrosion caused by humidity, may damage the printed line. However, as well as electrical power, rain sensors, for example, require the provision of a data link, to transfer data to the CPU within the vehicle to control wiper motion. Even if the electrical power can be provided using a printed circuit, a data link still requires cabling. A further alternative is to use transparent, flat, flexible connectors, which are insulated and provided with adhesive on both sides, for both electrical power supply and data transfer. However, such connectors are not totally optical transparent but are hazy and/or have a tendency to become hazy or yellowed with exposure to UV radiation, and their long term behaviour within automotive glazings has not been tested.

There therefore exists a need to be able to provide electrical and data connections to sensors and other electrical devices positioned on automotive glazings, without trailing cabling or printed circuits being visible to either passengers within the vehicle or passers by outside of the vehicle.

The present invention aims to address these problems by providing an automotive glazing, comprising: a first ply and a second ply of transparent glazing material; a ply of interlayer material extending between the plies of glazing material; an electric circuit, comprising a first connector portion, situated adjacent the ply of interlayer material, the first connector portion being configured to form a coupling region such that electrical signals in the circuit can be coupled between the coupling region and an electrical device placed on the glazing; and a second connector portion on the surface of the second ply of glazing material situated away from the interlayer material, and connectable to an electrical device; wherein the second connector portion is adapted to receive a ferromagnetic core.

By including a connector portion within the laminated glazing structure, electrical signals such as power and data can be coupled to a second connector portion located on the outside of the structure. This removes the need for trailing wires and increases the flexibility of positioning of electrical devices when connected to such connectors.

Preferably, the coupling has an inductive coupling component. Preferably, the first connector portion forms the primary winding of an inductor. Preferably, the second connector portion forms the secondary winding of an inductor.

The electric circuit and the first connector portion may be formed from an electrically conductive wire. In this situation, the connector portion may be embedded in the interlayer material.

Alternatively, the electric circuit and the first connection portion may be formed from a region of electrically conductive silver print.

The first and second connector portions are preferably in registration with each other.

Preferably, the electrical device is one of a rain sensor, a light sensor, a lighting device, a moisture sensor, a camera, a route guidance receiver or an electrochromic mirror.

A control signal may be sent to the device, and/or information may be sent by the device by radio-frequency or infrared transmission. Alternatively, the control signals may be sent to the device and information signals may be sent by the device in a different frequency band by coupling between the coupling region and the second connector portion. Alternatively, the control signals may be sent to the device and information signals may be sent by the device by modulating the input power of the first connector portion and/or modulating a load provided by the device.

The glazing may further comprise a third connector position, situated adjacent the ply of interlayer material and configured to foam a coupling region, and a fourth connector portion, situated the surface of the first ply of glazing material away from the interlayer material.

The wire may have a thickness in the region of 10-500 μm, but more preferably, the wire has a thickness in the region of 10-150 μm.

Preferably, at least the first ply of transparent glazing material is one of annealed, toughened or semi-toughened silicate float glass. Preferably, the ply of interlayer material is polyvinyl butyral.

Preferably the glazing further comprises an electrical device, mounted on the glazing, and in electrical contact with the second connector portion.

The present invention also provides an automotive glazing, comprising: a ply of transparent glazing material; a ply of polymer material having a first surface placed on one surface of the ply of glazing material; an electric circuit having a first electrical conductor portion situated between the ply of glazing material and the ply of polymer material; an electrical device bonded to a second surface of the ply of polymer material, the electrical device comprising a second electrical conductor portion such that signals may be coupled between the first electrical conductor portion and the second electrical conductor portion, wherein one of the second electrical conductor portion and the electrical device comprises a ferromagnetic core.

By including a connector portion within the laminated glazing structure, electrical power can be coupled to a second connector portion located on the outside of the structure. This removes the need for trailing wires and increases the flexibility of positioning of electrical devices when connected to such connectors.

Preferably, the coupling has an inductive coupling component. Preferably, the first connector portion forms the primary winding of an inductor. Preferably, the second connector portion forms the secondary winding of an inductor.

The electric circuit and the first connector portion may be formed from an electrically conductive wire. In this situation, the connector portion may be embedded in the ply of polymer material.

Alternatively, the electric circuit and the first connection portion may be formed from a region of electrically conductive silver print.

The first and second connector portions are preferably in registration with each other.

Preferably, the electrical device is one of a rain sensor, a light sensor, a lighting device, a moisture sensor, a camera, a route guidance receiver or an electrochromic mirror.

A control signal may be sent to the device, and/or information may be sent by the device by radio-frequency or infrared transmission. Alternatively, the control signals may be sent to the device and information signals may be sent by the device in a different frequency band by coupling between the coupling region and the second connector portion. Alternatively, the control signals may be sent to the device and information signals may be sent by the device by modulating the input power of the first connector portion and/or modulating a load provided by the device.

The glazing may further comprise a third connector position, situated adjacent the ply of interlayer material and configured to form a coupling region, and a fourth connector portion, situated the surface of the first ply of glazing material away from the interlayer material.

The wire may have a thickness in the region of 10-500 µm, but more preferably, the wire has a thickness in the region of 10-150 µm.

Preferably, at least the first ply of transparent glazing material is one of annealed, toughened or semi-toughened silicate float glass. The ply of polymer material may be self-adhesive. Preferably the ply of polymer material is polyethylene terephthalate.

The invention will now be described by way of example only, and with reference to the accompanying drawings in which:

FIG. 2 is a schematic cross-section showing the primary and secondary coils of a connector on a laminated glazing;

FIG. 3 is a schematic exploded view showing a primary coil within a laminated glazing and an electronic device on the surface of a laminated glazing;

FIG. 4 shows three schematic representations of wiring patterns;

FIG. 14 shows a schematic cross-section of a bi-layer glazing comprising an inductor arrangement in accordance with the present invention.

One solution to the problem of minimising the visibility of the cabling to electronic devices on laminated automotive glazings, and hence increasing the flexibility in where such devices can be positioned, is to use inductive coupling (coupling having a predominantly inductive nature) to provide electrical power to and transfer data from the device. By using thin wires (wires having a thickness of less than 50 µm) it is possible to include the wiring within the vision area (as defined by ECE R43) of a glazing, as the resulting power circuit is practically invisible from both inside and outside when the glazing is fitted within a vehicle. In particular, the use of a ferromagnetic core to enhance inductance and coupling efficiency leads to a system that may be used to power sensors and other electrical devices commonly in use in the automotive industry with little impact on the appearance of the glazing.

Figure 1:
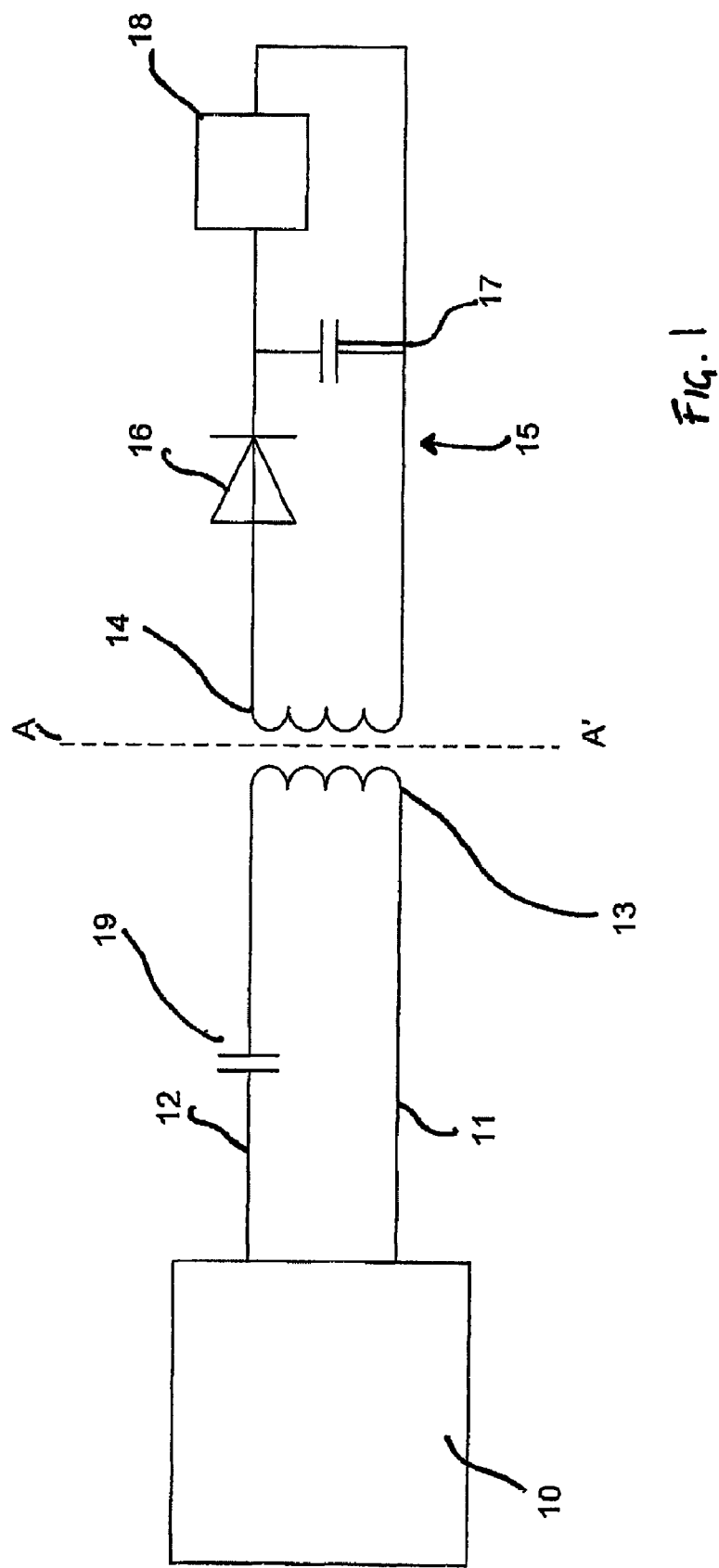
FIG. 1 is a circuit diagram showing the inductive coupling between the circuitry within a vehicle and an electrical device.

FIG. 1 shows a circuit diagram illustrating how the electrical power from the circuitry within a vehicle may be inductively coupled with an electrical device positioned on the surface of the glazing using an inductor arrangement. Electronic circuitry 10 which generates high frequency AC current is connected via a wiring harness (represented simply by two wires 11, 12) to a primary inductor 13, configured from electrical conductors within the laminated glazing structure. A secondary inductor 14 is connected to a rectifying circuit 15 (comprising for examples a diode 16 and a capacitor 17) and a load 18. The primary inductor 13 and secondary inductor 14 are positioned on opposite sides of a ply of glass within an automotive glazing (as represented by dotted line A A' and shown in more detail in FIGS. 2 and 3 below). When the circuit is completed, electrical power from the circuitry 10 is transferred through the ply of glass via the inductive coupling between the primary inductor 13 and the secondary inductor 14. A capacitor 19 may be included on the primary inductor 13 side to use the resonance compensation of the inductance of the primary coil. Depending on the design of the circuitry driving the device, it may be useful to connect the capacitor 19 in series. The capacitor can improve the power being transferred through the transformer at a given input voltage. If a low impedance circuit is used to drive the device, and the coupling achieved is not ideal, the capacitor 19 can compensate for the effect of the inductance L of the circuit. Therefore the total impedance of the system (connector, circuit and device) is reduced, and a high current will flow through the primary inductor 13.

Under different circumstances it may be desirable to have the capacitor 19 connected in parallel with the primary coil 13.

FIG. 2 shows a schematic cross section of a laminated glazing 20, comprising a first ply of a transparent glazing material 21 and a second ply of a transparent glazing material 22 having a sheet of interlayer 23 material laminated in between. The transparent glazing material may be annealed, toughened or semi-toughened silicate float glass. A primary inductor winding 24 is positioned between the interlayer 23 and the second ply of transparent glazing material 22. A secondary inductor winding 25 is positioned in registration with the primary inductor winding 24 on the outer surface of the second ply of transparent glazing material 22. An electrical device 26 is positioned on the secondary inductor winding 25, and connected to it via a rectifying circuit (not shown). When the glazing is fitted into a vehicle, the electrical device will be positioned within the vehicle.

FIG. 3 shows an exploded perspective view of the glazing in FIG. 2. The plies of transparent glazing material are shown in reverse order so that the arrangement of the primary inductor winding 24 and the electrical device 26 may be seen more clearly. Wires 27 28 from the wiring harness of the vehicle cross the interlayer to the position of the primary inductor winding 24.

The primary inductor winding is preferably formed by laying down wires onto a sheet of interlayer material, such as polyvinyl butyral, in a specified pattern, prior to lamination. Example patterns are shown in FIG. 4, and may include a circular 41 or square 42 loop, or a spiral 43. Alternatively, the wires may be laid onto the surface of a ply of glass and covered with the interlayer material during lamination. Preferably, wiring techniques, where the wire is played out though a head mounted on a x-y plotting arm are used to lay down the wire onto the surface of the interlayer material.

Alternatively, the primary inductor wiring and power circuit may comprise screen printed conductor lines having a thickness in the region of 0.25-0.5 mm. The conductor lines are preferably printed using a silver-containing electrically conductive ink, and may be printed onto a surface of the interlayer material, or onto a surface of one of the plies of transparent glazing material that will be in contact with the interlayer material once the glazing has been laminated.

As shown in FIG. 3, when thin copper wires are used to form the power circuit and primary inductor, the wires may exit the glazing to a connector external to the glazing. Alternatively, a galvanic connector may be connected (for example soldered) to the end of wires or onto a printed power circuit on the surface of the interlayer or one of the plies of transparent glazing material. Such connectors are regularly used for connecting antenna or heating circuits included in laminated glazings to the vehicle wiring harness. Flat cable connectors, such as those described in EP 0 608 554, may be used to connect the power circuit to the wiring harness of the vehicle.

In order to determine whether the above described connector was able to provide sufficient electrical power to an electrical device typically used in an automotive vehicle, a power circuit similar to that shown in FIG. 1 was set up. The load used was a light emitting diode.

A frequency generator, generating AC at 120 kHz, within an input amplitude of 12V (peak-to-peak) and an input current of 150 mA (peak-to-peak) was used to power the power circuit. The primary inductor coil was laid down on one surface of a ply of glass in a rectangle measuring 50 mm by 80 mm. The secondary inductor coil was formed from the same wire, and as laid down on the opposite surface of the ply of glass in a rectangle measuring 45 mm by 40 mm. The primary inductor coil was measured as having 13.5 µH/0.4Ω and the secondary inductor coil 2.1 mH/5.5Ω. At the light emitting diode, the voltage was 1.76V and the current 10.5 mA. This was sufficient to cause the diode to emit light.

Figure 5:
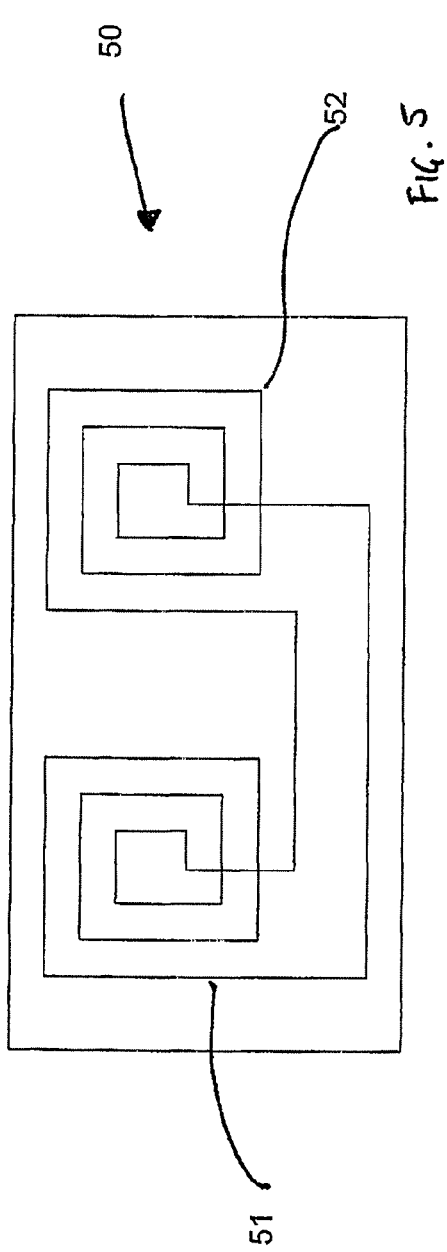
FIG. 5 shows a schematic plan view of a laminated glazing having two coupling regions.
Figure 6:
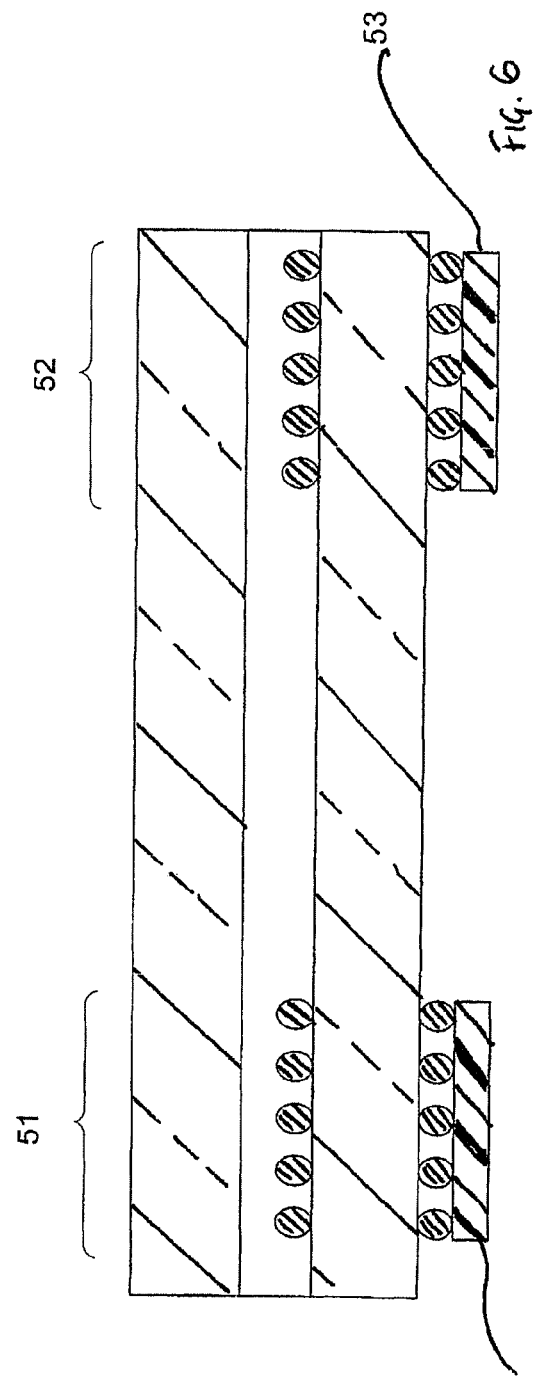
FIG. 6 shows schematic cross section of the glazing of FIG. 5.

In accordance with a further embodiment of the present invention, a second coupling region may be formed to replace a galvanic or other physical contact between the power circuit and the vehicle wiring harness. This arrangement is illustrated in FIGS. 5 and 6. FIG. 5 is a schematic plan view of a laminated glazing 50 having two coupling regions 51 52. The first coupling region 51 is configured from the power circuit in the region where a sensor will be position when the glazing is fitted into a vehicle. The second coupling region is configured from the power circuit in an edge region of the glazing, corresponding to the position of a connection 53 to a power source. FIG. 6 shows schematic cross section of the glazing of FIG. 5. The first coupling region 51 is positioned so as to be in registration with a sensor 54, with the second coupling region 52 being positioned so as to be in registration with the connection 53, which is positioned on the same side of the glazing as the sensor 54. The connection 53 may be a cable leading directly from the wiring harness of the vehicle, and therefore in the form of a primary winding coil, or a metal plate, adhered to the surface of the transparent glazing material and having wiring or a connector from the wiring harness of the vehicle soldered thereto. Rather than wiring, at least one of the first 51 and second 52 coupling regions or the connector 53 may be formed from a printed region, which may be a solid print, such as a patch, or an open print, such as a coil. Alternatively, the second coupling region may provide capacitive coupling. Although preferably the second coupling region provides inductively coupled power transfer, the conductors used to form the region may instead be configured to provide capacitive coupling.

In FIGS. 2, 3 5 and 6, the primary and secondary inductor windings are shown as being in registration (directly in line with one another vertically). However, the windings may be displaced such that only part of the windings overlap, depending on the design and electrical requirements for the electrical device. Preferably, the primary inductor winding is a thin copper, silver, aluminium, gold or tungsten wire in thickness, preferably in the range of 10 to 500 µm, more preferably, 10 to 150 µm. Such a thickness of wire is practically invisible to the eye when incorporated into a laminated glazing. The wires leading to the primary inductor may also be crimped to reduce their visibility further. In order to lay down patterns with overlapping wires, the wire may be covered in an insulating coating. The coating may be adhesive to aid with embedding the wire within the interlayer material. The secondary inductor winding may be any suitable bare or coated wire which provides the necessary inductive coupling for the size of winding and type of electrical device. Alternatively, the secondary inductor may be a strip of electrically conductive material, such as copper. The secondary inductor winding may be included within the electrical device, or added thereto before the device is positioned on the surface of the glazing.

The design of both inductors is determined according to the needs of the load; in particular, the number of turns in each winding is determined by the voltage needed by the load. The number of turns of the primary conductor is also determined by technological restrictions, such as the number of turns which can be embedded in a restricted area.

The frequency at which the power circuit is driven should be chosen to deliver maximum coupling efficiency. One criterion by which the efficiency is determined is the impedance, $Z$, of the primary winding, which is given by:

$$Z = R + i2\pi fL$$

where R is the resistance of the conductor forming the winding in Ohms, f is the frequency of the AC signal in Hz, and L is the inductance of the primary winding in Henrys. i is the square root of −1. For maximum efficiency, the imaginary portion of the impedance must be high compared with the resistance. L is limited by the number of turns of the primary winding, hence f must be high to overcome the resistance of the conductor forming the wiring. As the number of turns in the primary winding may be up to 100, given the size of the sensor in which the winding is included, high voltage and low current in the primary winding result in high efficiency if the primary and secondary windings are in a down converter relationship, where $n_1$ (number of turns in the primary)>$n_2$ (number of turns in the secondary).

The size of the inductor windings should be optimised within the restricted space available in the vehicle in which the glazing will be fitted. If the size of both the primary and the secondary inductor coils is increased, not only will the inductance increase, but the resistance of the arrangement will also increase. This should be borne in mind when considering the optimum winding configurations.

Typical electrical devices which may be connected to a vehicle power supply using the above described connectors include rain sensors, light sensors, moisture sensors, electrochromic mirrors, cameras, route guidance receivers (such as satellite navigation equipment) and lighting devices, such as light emitting diodes. However, in addition to power supply, some devices also require a data connection (such as rain sensors and lane control cameras) and heating (lane control cameras). The data connection enables control signals to be sent to the electrical device, and information to be sent by the electrical device. Data connection may be provided using radio frequency technologies, such as Bluetooth™ or infrared links, known from typical remote control units. However, one other possibility is that signals to and from the device may be fed via the connector. In this situation, the data signal has a different, preferably higher, frequency than the power signal. The modulated signal may be provided using the same circuit as the power supply, or by using a separate, dedicated circuit. Alternatively, the power signal may be modulated to provide both data and power by controlling the power supply via the CPU of the vehicle, or by controlling the load provided by the electrical device.

Where heating is also required, for example, for a lane departure camera, a separate heating power circuit may be used to that providing the power supply, enabling separate switching of the heating function from the power supply and/or data connection. Heating may also be realised by embedding wiring into the interlayer using the same technology as for the inductive coupling described above. The additional heater wires carry a current, which produces heat in the interlayer, thereby heating the glass surface and the sensors.

As an alternative to providing two separate wire circuits where heating is also required, a common circuit supplied by both AC and DC sources may be used. The AC may be used for signal transfer, as described above, and the DC to provide ohmic heating due to the resistance of the wire. Little or no interference between the two currents will occur if current levels are kept in the region where the core of the inductor does not saturate.

Figures 7, 8:
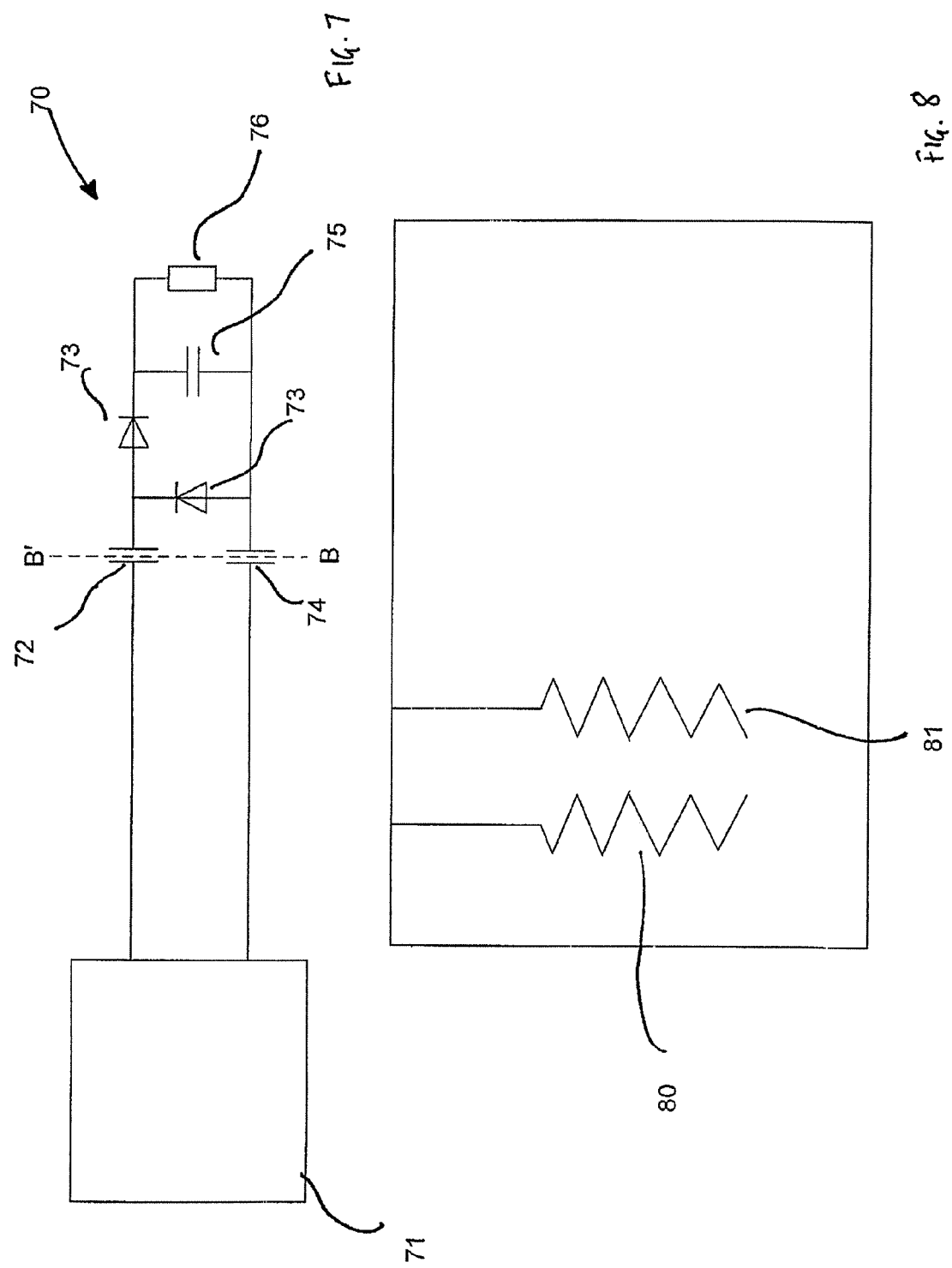
FIG. 7 is a circuit diagram showing a basic power circuit for capacitive coupling of a sensor.
FIG. 8 is a schematic plan view of a power circuit within the laminated glazing for a capacitive coupling region.

In the examples described above, the coupling of the power signal between the sensor and the power circuit is achieved by inductive coupling. However, capacitive coupling (coupling having a predominantly capacitive nature) may be used instead. FIG. 7 is a circuit diagram showing a basic power circuit for capacitive coupling of a sensor, and FIG. 8 is a schematic plan view of the power circuit within the laminated glazing for such capacitive coupling.

In FIG. 7, the power circuit 70 comprises an AC source 71 connected to a rectification circuit comprising a capacitor 75 and diodes 73. A load 76 is connected in parallel with the rectification circuit capacitor 75. Both capacitors 72, 74 transfer power from inside the laminated glazing (left of line B-B') to the outer surface of the glass, where the sensor is applied. The capacitors 72 and 74 are each formed by two conductors, one being embedded into the laminated glazing, and one attached to the outer surface of the glass. As shown in FIG. 8, two conductors 80 81 are laid in a zig zag pattern within the laminated glazing 82 to form the inner part of the capacitors 72 and 74. These conductors may be wires or printed lines, and may be laid in other patterns to ensure sufficient capacitance for the sensor to function. Again, the external connection to the wiring harness of the vehicle may be replaced with either an inductive or a capacitive connection.

Referring again to inductive coupling, as part of the above investigations, it has been found that the use of a ferromagnetic core in conjunction with the secondary inductor winding is particularly preferable as increases both the inductance L and the coupling factor between the primary and secondary inductor windings. As above, the primary and secondary inductor windings are formed by electrical conductors, such as wires or electrically conductive silver print or the like circuit lines.

Figure 9:
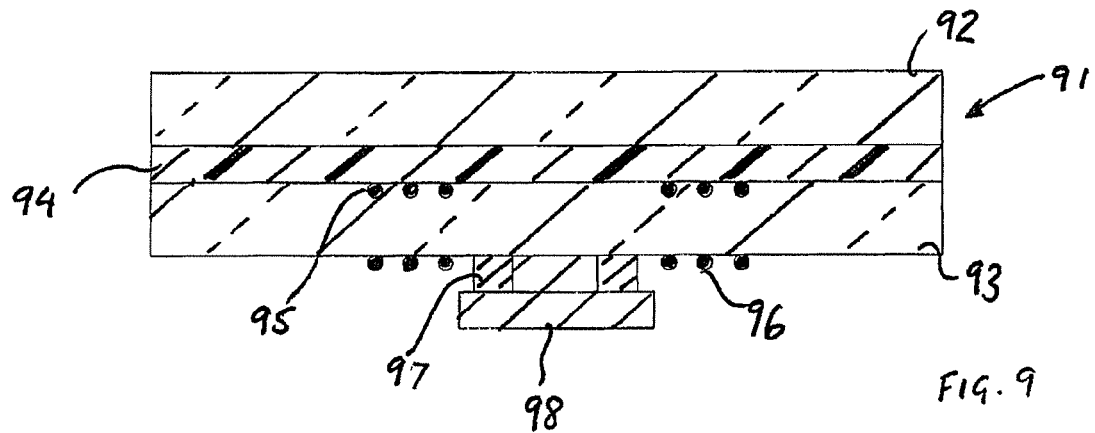
FIG. 9 shows a schematic cross-section of a laminated glazing comprising an inductor circuit having a ferromagnetic core.

FIG. 9 shows a schematic cross-section of a laminated glazing comprising an inductor circuit having a ferromagnetic core. The glazing 91 comprises first 92 and second 93 plies of transparent glazing material having a ply of an interlayer material 94 extending between them and laminated therewith. A primary inductor winding 95 is included within the structure of the laminated glazing 91, situated adjacent the ply of interlayer material 94 in contact with the first ply of transparent glazing material 92. A secondary inductor winding 96 is positioned on the surface of the second ply of transparent glazing material 93, away from the ply of interlayer material 94, and will face into the vehicle once the glazing 91 has been fitted in place. The secondary inductor winding 96 is adapted to receive a ferromagnetic core 97. This core acts to increase both the inductance and coupling factor of the inductor winding arrangement. The increase in coupling factor is associated with the presence of the core 97 preventing closure of the flux lines of the primary inductor winding 95, forcing an increased number of flux lines to enter the secondary inductor winding 96, inducing a voltage within the secondary inductor winding 96 and transferring power.

In the course of experiments, it has been found that the outer region of the ferromagnetic core 97 has a greater importance in inductive energy transfer. An electrical device 98 may therefore be located in the centre of the ferromagnetic core 97. By doing so, best use of the space (volume) available for the device 98 in a vehicle is made and, for example, a rain or light sensor has direct optical contact to the windscreen.

Figure 10:
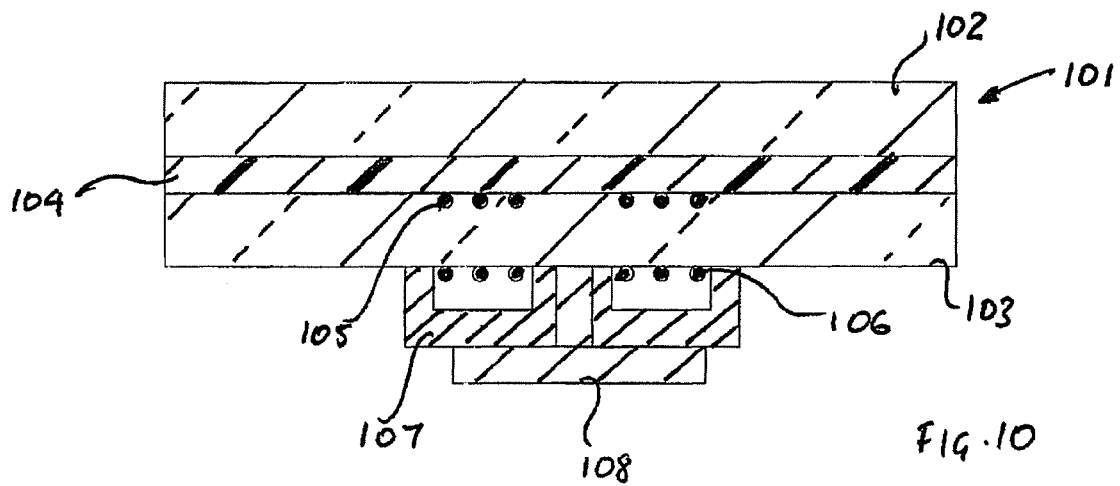
FIG. 10 shows a schematic cross-section of a laminated glazing comprising an inductor circuit having a ferromagnetic core that surrounds the entire secondary inductor winding.

FIG. 10 shows a schematic cross-section of a laminated glazing comprising an inductor circuit having a ferromagnetic core that surrounds the entire secondary inductor winding. The glazing 101 comprises first 102 and second 103 plies of transparent glazing material having a ply of an interlayer material 104 extending between them and laminated therewith. A primary inductor winding 105 is included within the structure of the laminated glazing 101, situated adjacent the ply of interlayer material 104 in contact with the first ply of transparent glazing material 102. A secondary inductor winding 106 is positioned on the surface of the second ply of transparent glazing material 103, away from the ply of interlayer material 104, and will face into the vehicle once the glazing 101 has been fitted in place. However, in this example, the secondary inductor winding 106 has been adapted to receive a ferromagnetic core 107 that surrounds the entire secondary inductor winding 106, increasing the inductance and coupling factor yet further. In a similar way, a device 108 may be located in the centre of the ferromagnetic core 107, giving the ferromagnetic core 107 the shape of a ring or cylinder.

Figure 11:
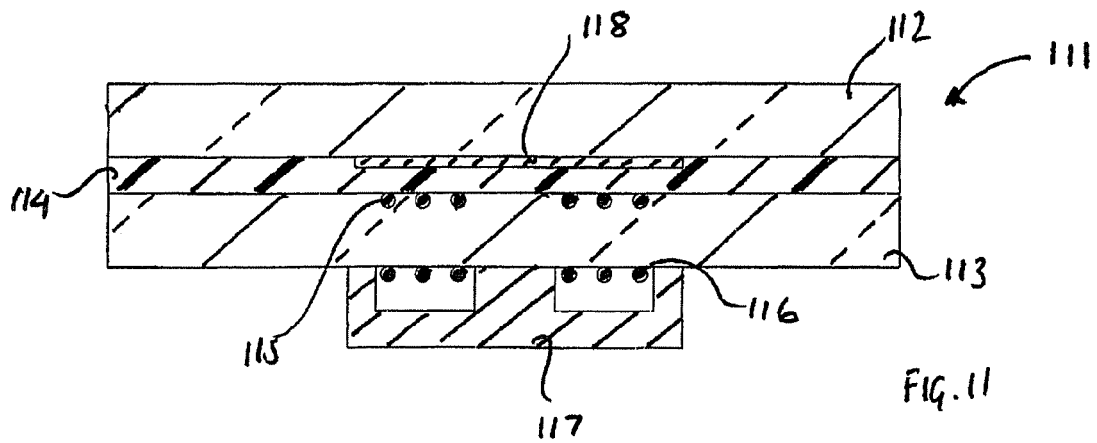
FIG. 11 shows a schematic cross-section of a laminated glazing comprising an inductor circuit having a ferromagnetic core that surrounds the entire secondary inductor winding, and an additional layer of ferromagnetic foil.
Figure 12:
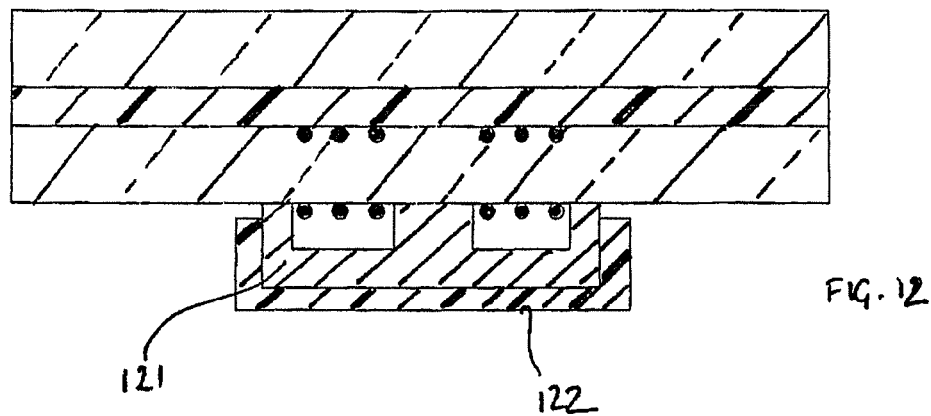
FIG. 12 shows a schematic cross-section of a laminated glazing comprising an inductor circuit having a ferromagnetic core that is contained within an electrical device.

An improvement to the arrangement shown in FIG. 10 is shown in FIG. 11. FIG. 11 shows a schematic cross-section of a laminated glazing comprising an inductor circuit having a ferromagnetic core that surrounds the entire secondary inductor winding, and an additional layer of ferromagnetic foil. The glazing 111 comprises first 112 and second 113 plies of transparent glazing material having a ply of an interlayer material 114 extending between them and laminated therewith. A primary inductor winding 115 is included within the structure of the laminated glazing 111, situated adjacent the ply of interlayer material 114 in contact with the first ply of transparent glazing material 112. A secondary inductor winding 116 is positioned on the surface of the second ply of transparent glazing material 113, away from the ply of interlayer material 114, and will face into the vehicle once the glazing 111 has been fitted in place. Again, the secondary inductor winding 116 has been adapted to receive a ferromagnetic core 117 that surrounds the entire primary inductor winding 116. In addition, a layer of a ferromagnetic material 118 is included within the structure of the laminated glazing 111. The ferromagnetic layer 118 is positioned between the ply of interlayer material 114 and the second ply of transparent glazing material 113. This ferromagnetic layer 118 acts to guide the magnetic flux lines of the secondary inductor winding 116 into the primary inductor winding 115. Although in FIGS. 9, 10 and 11, the ferromagnetic core is positioned within the secondary inductor winding on the surface of the glazing, as an alternative, the ferromagnetic core may be contained within the device to be mounted on the glazing when fitted into a vehicle. In this situation, the secondary inductor winding is adapted to receive the portion of the electrical device containing the ferromagnetic core. This is shown in FIG. 12. FIG. 12 shows a schematic cross-section of a laminated glazing comprising an inductor circuit having a ferromagnetic core 121 that is contained within an electrical device 122.

In each of these examples, the choice of the ferromagnetic material depends on several factors:
- high permeability
- low losses/damping
- appropriate saturation at the operating frequency of the device to be powered Suitable materials include those known for use in switched power supplies, for example, N30 and N48 materials available from EPCOS AG, St.-Martin-Strasse 53, 81669 Munich, Germany. Materials suitable for the ferromagnetic layer 118 include rapidly solidified magnetic materials such as those sold as VITROPERM, available from VACUUMSCHMELZE GmbH & Co. KG, Grüner Weg 37, D-63450 Hanau, Germany.

In order to examine the effect of ferromagnetic cores on the inductor arrangements described above, four different inductor configurations were produced and tested. The test arrangement comprised placing a primary inductor winding on a surface of a single ply of 2.6 mm thick silicate float glass, and the secondary winding on the opposite surface. The following coil configurations, as shown in Table 1, were used:

TABLE 1

|  | Configuration 1 | | Configuration 2 | |
| --- | --- | --- | --- | --- |
|  | Primary | Secondary | Primary | Secondary |
| No. Turns | 15 | 40 | 10 | 40 |
| $D_1$ | 35.5 | 36 | 35.5 | 36 |
| $D_2$ | 42 | 39 | 39.0 | 39 | coil configurations used in testing

The coils formed were cylindrical, with $D_1$ being the inner diameter and $D_2$ the outer diameter of each coil. Each core configuration used was that shown in FIG. 9 above.

Each configuration was tested with and without a ferromagnetic core as part of the secondary inductor winding. The core material used was N48, available from EPCOS AG, as above.

Within the experimental set up used here three characteristic modes were examined, characterized by different input power levels for each level the efficiency of the whole system was measured as well as the transferred power.

1. Input power sufficient for a load drawing approximately 250 mW, equivalent to a typical commercially available optical rain sensor.
2. The input power at which the driving circuitry provides an AC voltage, which may still be described as a sine function. (DC input voltage 12 V)
3. Maximum input power ad 12V DC, which leads to the maximum power transferable.

Figure 13:
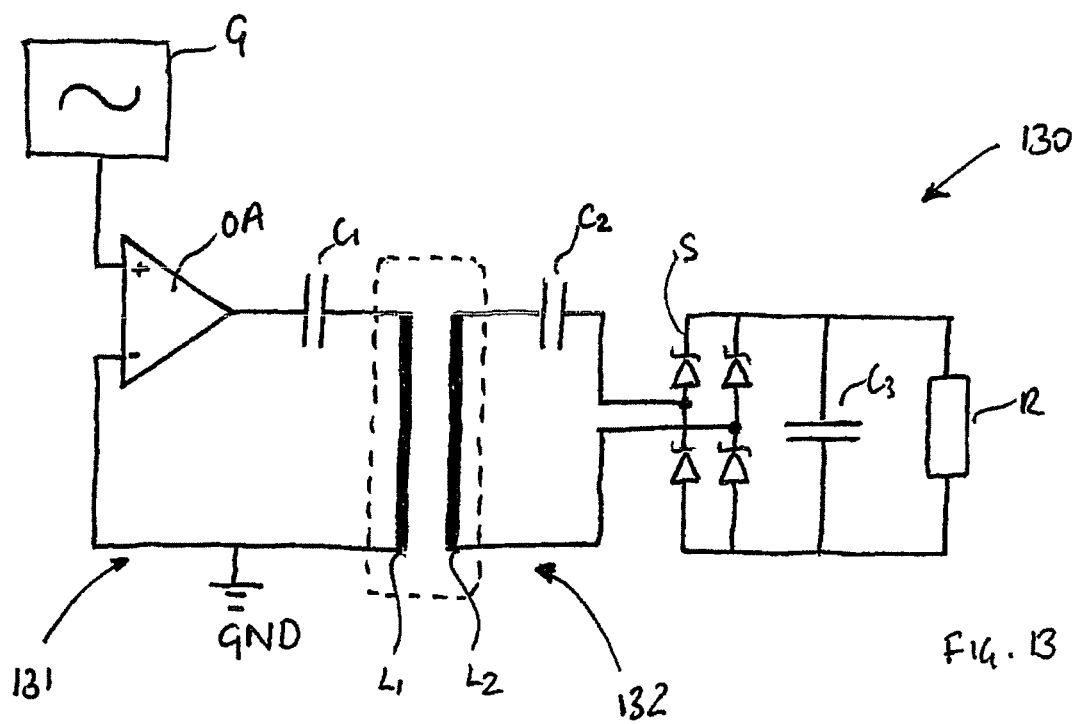
FIG. 13 is a schematic circuit diagram showing the test circuit used to measure the performance of the inductor arrangement.

FIG. 13 is a schematic circuit diagram showing the test circuit used to measure the performance of the inductor arrangement. The circuit 130 comprises a signal generator G connected to an operational amplifier OA in the primary inductor circuit 131. A capacitor $C_1$ is connected in series with the operational amplifier OA and the primary inductor winding $L_1$. The output of the operational amplifier OA is connected to ground GND. In the secondary inductor circuit 132, a secondary inductor winding $L_2$ is connected in series with a second capacitor $C_2$ and four Schottky diodes S. The Schottky diodes S are themselves connected in parallel with a third capacitor $C_3$ and a resistor R. The third capacitor C3 acts as a filter, providing capacitive resonance compensation.

Table 2 below is a summary of the coupling efficiency obtained under each of the three tests above for all four coil configurations:

TABLE 2

|  | Configuration 1 (with ferromagnetic core) | Configuration 1 (without ferromagnetic core) | Configuration 2 (with ferromagnetic core) | Configuration 2 (without ferromagnetic core) |
| --- | --- | --- | --- | --- |
| Test 1 | 16.6 | 11.7 | 10.5 | 7.4 |
| Test 2 | 27.3 | 17.6 | 24.0 | 15.6 |
| Test 3 | 31.1 | 21.5 | 29.9 | 19.1 | overall efficiency (%) achieved for Tests 1, 2 and 3 outlined above

The results of the tests indicate that the presence of the ferromagnetic core increases the coupling factor (efficiency) of power transfer between the primary and secondary inductor windings. The results of Test 1 indicate that the coupling achievable is sufficient to power a typical commercially available rain sensor. As indicated in Test 3, by using a 12V DC power supply, an output power of up to 2 W may be achieved.

Preferably the ferromagnetic core used has the shape of a capital "U" or "E", such that a magnetic field loop is formed. Other core shapes satisfying this condition may also be used.

Although the above examples involve the use of laminated glazings, it is also possible to apply the same inventive concept to so-called bi-layer glazings. A bi-layer glazing construction typically comprises a single ply of toughened or semi-toughened glass having a ply (or film) of a polymer material applied to the surface which will face into a vehicle when fitted. The film acts to improve the impact resistance properties of the single-ply of glass whilst providing a glazing construction which is lighter in weight than a laminated glazing. Again, wiring for sensors and the like needs to be covered with a cable channel, or hidden within the obscuration band on the glazing or within the trim of the vehicle.

FIG. 14 shows a schematic cross section of a bi-layer glazing 140, comprising a first ply of a transparent glazing material 141 having a ply of polymer material 142, such as a PET film. The ply of polymer material used may be a single-ply or multiple-ply film, and is preferably a self-adhesive film. Suitable self-adhesive films are those that employ a pressure-sensitive adhesive, such as that sold as Spallshield™, available from Du Pont. The film may have additional solar or thermal control properties, and/or may be clear or tinted. The ply of transparent glazing material used may be toughened, semi-toughened or annealed glass, and itself may be clear or tinted. The transparent glazing material may be annealed or semi-toughened silicate float glass. A primary inductor winding 143 is positioned between the thin film 144 and the ply of transparent glazing material 145. A secondary inductor winding 144 is positioned in registration with the primary inductor winding 143 on the outer surface of the film 142. An electrical device 145 is positioned on the secondary inductor winding 144, and connected to it via a rectifying circuit (not shown). When the glazing is fitted into a vehicle, the electrical device will be positioned within the vehicle. As above, preferably the secondary inductor winding is adapted to receive a ferromagnetic core. The core is preferably provided as part of the device connected to the secondary inductor winding.

The primary inductor winding is preferably formed by laying down wires onto the thin film in a specified pattern, prior to lamination. Alternatively, the wires may be laid onto the surface of a ply of glass and covered with the film during lamination. Preferably, wiring techniques, where the wire is played out through a head mounted on a x-y plotting arm are used to lay down the wire onto the surface of the film. Once the circuit is in place, the film is adhered to the ply of glass, after de-airing, using rollers.

Alternatively, the primary inductor wiring and power circuit may comprise screen printed conductor lines having a thickness in the region of 0.25-0.5 mm. The conductor lines are preferably printed using a silver-containing electrically conductive ink, and may be printed onto a surface of the interlayer material, or onto a surface of one of the plies of transparent glazing material that will be in contact with the interlayer material once the glazing has been laminated.

When thin copper wires are used to form the power circuit and primary inductor, the wires may exit the glazing to a connector external to the glazing. Alternatively, a galvanic connector may be soldered to the end of wires or onto a printed power circuit on the surface of the interlayer or one of the plies of transparent glazing material. Such connectors are regularly used for connecting antenna circuits included in laminated glazings to the vehicle wiring harness. Flat cable connectors, such as those described in EP 0 608 554, may be used to connect the power circuit to the wiring harness of the vehicle.

As with the arrangements shown in FIGS. 9, 10, 11 and 12 above, the coupling factor (efficiency) between the primary and secondary inductor windings is increased when the inductor arrangement is coupled with a ferromagnetic core. This leads to a bi-layer glazing capable of supporting a sensor or other electrical device with cabling virtually invisible to a person viewing the glazing.

The invention claimed is:

1. An automotive glazing, comprising:
a first ply and a second ply of transparent glazing material;
a ply of interlayer material extending between the plies of glazing material;
an electric circuit, comprising a first connector portion, situated adjacent the ply of interlayer material, the first connector portion being configured to form a coupling region such that electrical signals in the circuit can be coupled between the coupling region and an electrical device placed on the glazing; and
a second connector portion on the surface of the second ply of glazing material situated away from the interlayer material, and connectable to an electrical device;
wherein the second connector portion is adapted to receive a ferromagnetic core.

2. The glazing of claim 1, wherein the coupling has an inductive coupling component.

3. The glazing of claim 1, wherein the first connector portion forms the primary winding of an inductor.

4. The glazing of claim 3, wherein the second connector portion forms the secondary winding of an inductor.

5. The glazing of claim 1, wherein the electric circuit and the first connector portion are formed from an electrically conductive wire.

6. The glazing of claim 5, wherein the first connector portion is embedded in the interlayer material.

7. The glazing of claim 5, wherein the wire has a thickness in the region of 10-500 μm.

8. The glazing of claim 5, wherein the wire has a thickness in the region of 10-150 μm.

9. The glazing of claim 1, wherein the electric circuit and the first connection portion are formed from a region of electrically conductive silver print.

10. The glazing of claim 1, wherein the first and second connector portions are in registration with each other.

11. The glazing of claim 1, wherein the electrical device is one of a rain sensor, a light sensor, a lighting device, a moisture sensor, a camera, a route guidance receiver or an electrochromic mirror.

12. The glazing of claim 1, wherein a control signal is sent to the device, and/or information is sent by the device by radio-frequency or infrared transmission.

13. The glazing of claim 1, wherein control signals are sent to the device and information signals are sent by the device in a different frequency band by coupling between the coupling region and the second connector portion.

14. The glazing of claim 1, wherein control signals are sent to the device and information signals are sent by the device by modulating the input power of the first connector portion and/or modulating a load provided by the device.

15. The glazing of claim 1, further comprising a third connector position, situated adjacent the ply of interlayer material and configured to form a coupling region, and a fourth connector portion, situated the surface of the first ply of glazing material away from the interlayer material.

16. The glazing of claim 1, wherein at least the first ply of transparent glazing material is one of annealed, toughened or semi-toughened silicate float glass.

17. The glazing of claim 1, wherein the ply of interlayer material is polyvinyl butyral.

18. The glazing of claim 1, further comprising an electrical device, mounted on the glazing, and in electrical contact with the second connector portion.

19. An automotive glazing, comprising:
a ply of transparent glazing material;
a ply of polymer material having a first surface placed on one surface of the ply of glazing material;
an electric circuit having a first electrical conductor portion situated between the ply of glazing material and the ply of polymer material;
an electrical device bonded to a second surface of the ply of polymer material, the electrical device comprising a second electrical conductor portion such that signals may be coupled between the first electrical conductor portion and the second electrical conductor portion,
wherein one of the second electrical conductor portion and the electrical device comprises a ferromagnetic core.

20. The glazing of claim 19, wherein the coupling has an inductive coupling component.

21. The glazing of claim 19, wherein the first connector portion forms the primary winding of an inductor.

22. The glazing of claim 21, wherein the second connector portion forms the secondary winding of an inductor.

23. The glazing of claim 19, wherein the electric circuit and the first connector portion are formed from an electrically conductive wire.

24. The glazing of claim 23, wherein the first connector portion is embedded in the ply of polymer material.

25. The glazing of claim 24, wherein the wire has a thickness in the region of 10-500 μm.

26. The glazing of claim 24, wherein the wire has a thickness in the region of 10-150 μm.

27. The glazing of claim 19, wherein the electric circuit and the first connection portion are formed from a region of electrically conductive silver print.

28. The glazing of claim 19, wherein the first and second connector portions are in registration with each other.

29. The glazing of claim 19, wherein the electrical device is one of a rain sensor, a light sensor, a lighting device, a moisture sensor, a camera, a route guidance receiver or an electrochromic mirror.

30. The glazing of claim 19, wherein a control signal is sent to the device, and/or information is sent by the device by radio-frequency or infrared transmission.

31. The glazing of claim 19, wherein control signals are sent to the device and information signals are sent by the device in a different frequency band by coupling between the coupling region and the second connector portion.

32. The glazing of claim 19, wherein control signals are sent to the device and information signals are sent by the device by modulating the input power of the first connector portion and/or modulating a load provided by the device.

33. The glazing of claim 19, further comprising a third connector position, situated adjacent the ply of interlayer material and configured to form a coupling region, and a fourth connector portion, situated the surface of the first ply of glazing material away from the interlayer material.

34. The glazing of claim 19, wherein the ply of transparent glazing material is one of annealed, toughened or semi-toughened silicate float glass.

35. The glazing of claim 19, wherein the ply of polymer material is self-adhesive.

36. The glazing of claim 19, wherein the ply of polymer material is polyethylene terephthalate.

* * * * *